(12) United States Patent
Festejo et al.

(10) Patent No.: US 8,035,613 B2
(45) Date of Patent: Oct. 11, 2011

(54) CONTROL OF DATA PROCESSING

(75) Inventors: Ronald Jonas Festejo, London (GB);
Peter Marshall, London (GB)

(73) Assignee: Sony Computer Entertainment Europe Ltd. (GB)

( * ) Notice: Subject to any disclaimer, the term of this patent is extended or adjusted under 35 U.S.C. 154(b) by 839 days.

(21) Appl. No.: 11/207,189

(22) Filed: Aug. 18, 2005

(65) Prior Publication Data

US 2006/0038819 A1    Feb. 23, 2006

Related U.S. Application Data

(63) Continuation of application No. PCT/GB2004/000703, filed on Feb. 20, 2004.

(51) Int. Cl.
*G09G 5/00* (2006.01)

(52) U.S. Cl. .......................... 345/156; 463/36

(58) Field of Classification Search .......... 348/373–375, 348/208.99–208.16; 345/156, 157; 463/36
See application file for complete search history.

(56) References Cited

U.S. PATENT DOCUMENTS

| | | | |
|---|---|---|---|
| 4,460,264 A * | 7/1984 | Winter | 396/165 |
| 6,157,744 A * | 12/2000 | Nagasaka et al. | 382/236 |
| 6,268,958 B1 | 7/2001 | Furuhashi | |
| 6,416,239 B1 | 7/2002 | Chou et al. | |
| 6,764,401 B1 * | 7/2004 | Akatsuka | 463/36 |
| 2002/0097247 A1 * | 7/2002 | Ohba | 345/501 |
| 2004/0047419 A1 * | 3/2004 | Wakabayashi et al. | 375/240.16 |

FOREIGN PATENT DOCUMENTS

| | | |
|---|---|---|
| DE | 196 03 766 | 8/1997 |
| EP | 0 660 265 | 6/1995 |
| EP | 0 833 503 | 4/1998 |
| GB | 1 253 985 | 11/1971 |
| JP | 02-079892 | 3/1990 |
| JP | 2-239780 | 9/1990 |
| JP | 07-213737 | 8/1995 |
| JP | 10-269471 | 10/1998 |
| JP | 2002-344948 | 11/2002 |
| WO | WO 99/07153 | 2/1999 |

OTHER PUBLICATIONS

Notice of Reasons for Rejection, transmitted on Feb. 6, 2007, for the corresponding Japanese Application No. 2006-502314.
European Search Report dated Feb. 5, 2008, from the corresponding European Application.
United Kingdom Search Report dated May 13, 2003.
International Search Report dated Aug. 2, 2004.
Written Opinion of the International Searching Authority dated Aug. 2, 2004.

* cited by examiner

*Primary Examiner* — Yong H Sim
(74) *Attorney, Agent, or Firm* — Lerner, David, Littenberg, Krumholz & Mentlik, LLP

(57) ABSTRACT

Data processing apparatus arranged to receive successive images from a video camera comprises means for detecting the average image luminance of images received from the video camera; means for detecting whether the average image luminance is lower than a threshold luminance value; and means for initiating a control function of the data processing apparatus in response to detection of an average image luminance which is lower than the threshold luminance value over at least a threshold number of successive images.

14 Claims, 11 Drawing Sheets

CONTROL OF DATA PROCESSING

CROSS-REFERENCE TO RELATED APPLICATION

Figure 1:
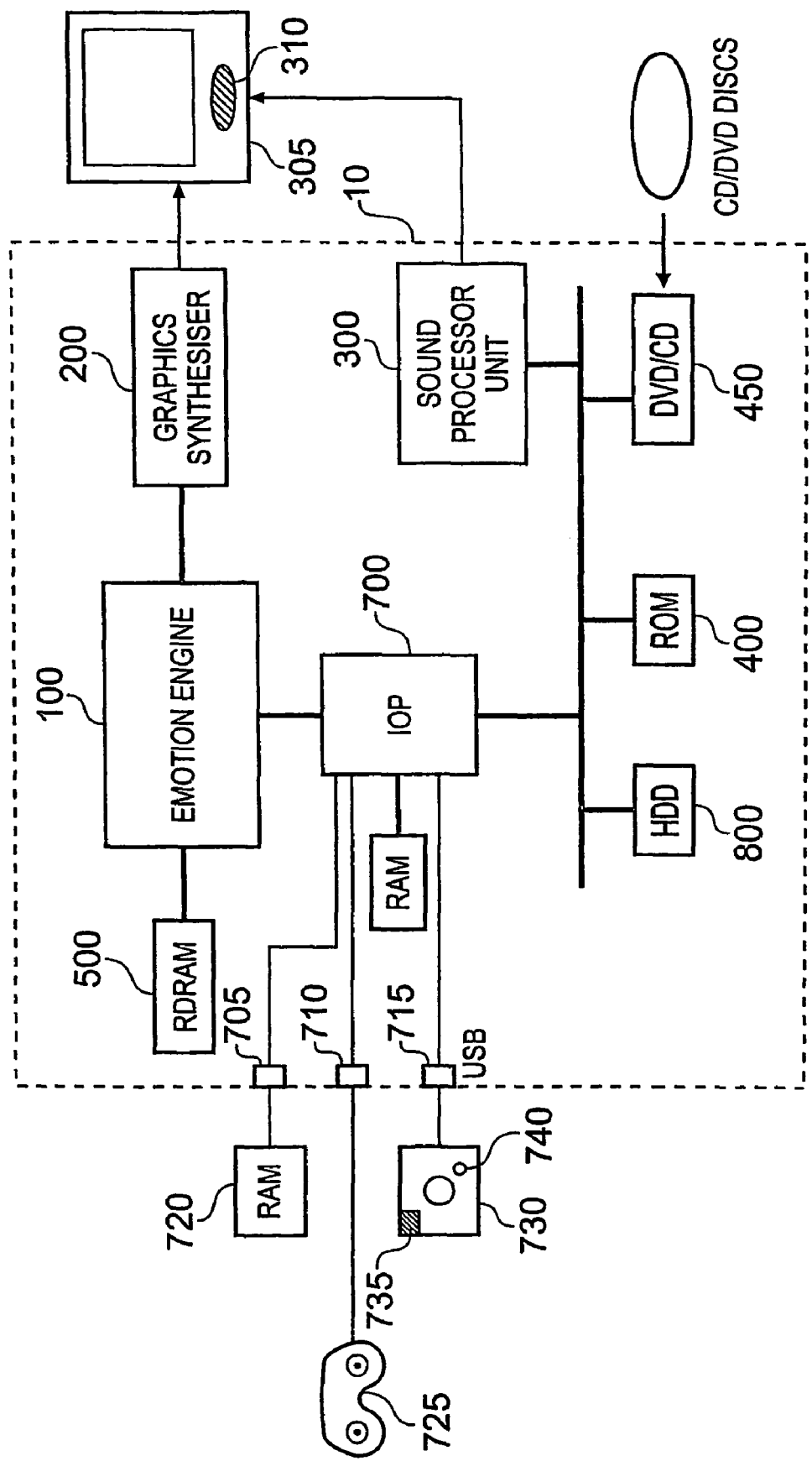

This application is a continuation of International Application PCT/GB2004/000703 filed on Feb. 20, 2004, now International Publication WO 2004/073815 and claims priority from United Kingdom Patent Application 0304022.7 filed on Feb. 21, 2003, the contents of which are herein wholly incorporated by reference.

This invention relates to the control of data processing operations. A particular example involves the control of video game processing operations, but the invention has more general application to other types of data processing.

In a conventional video games machine, a user views the game on a video monitor or television screen, and controls operation of the game using a hand-held keypad or joystick. With some games machines such as the Sony® PlayStation® 2, a handheld controller provides two joysticks and several user-operated keys, along with a vibrating element to provide tactile feedback to the user of events occurring within the game.

It has been proposed that games machines could make use of video cameras. This can allow an image of the user to appear within the game scenario, or for actions by the user, such as waving a "wand" in the air, to be translated into corresponding actions of a character within the game.

A disadvantage of this arrangement is that the user has to operate the handheld controller to switch between game functions, and generally to control operation of the games machine.

It has been proposed in a copending patent application by the same applicants that the user may control some operations of the games machine by activating screen "buttons", in particular by causing image motion (as viewed by the camera) at image positions corresponding to those screen buttons. However, this still leaves a difficulty if the user wishes to activate a function for which a corresponding screen button is not currently displayed. Here it is noted that the screen area is relatively limited, and it is in the interests of the software designer to allocate as much as possible of the screen area to actual game activities. Indeed, during the actual playing of a game (rather than a set-up phase of the game) it would be preferable to avoid using any screen buttons, so as to use substantially all of the screen area for the game scenario. In any event, it is not practicable to provide a screen button corresponding to every control function which would be accessible from a hand-held controller.

This invention provides data processing apparatus arranged to receive successive images from a video camera; the apparatus comprising:

means for detecting the average image luminance of images received from the video camera;

means for detecting whether the average image luminance is lower than a threshold luminance value; and means for initiating a control function of the data processing apparatus in response to detection of an average image luminance which is lower than the threshold luminance value over at least a threshold number of successive images.

The invention provides an elegantly simple and convenient solution to the problem described above. During the operation of a game, there is no need to implement display screen-based user controls. Instead, the user can cause a change in the game operation by initiating a change in average image luminance which lasts for at least the threshold period. One way of doing this is to cover (at least partially) the lens of the video camera.

Preferably the apparatus is a games machine. Preferably the apparatus comprises a video camera for supplying the successive images.

Although the control function could be fixed, or could be fixed in respect of a currently running application (e.g. game) program, it is preferred that the apparatus comprises means for detecting a current operational mode of the data processing apparatus; and that the control function is selected from a group of control functions, the selection being dependant on the current operational mode of the data processing apparatus. This allows what is effectively a single command (covering up the camera lens) to have different functions depending on the current operational mode of the machine. For example, in a game playing operational mode, it is preferred that the control function is a game control function such as a game pause function. In a game set-up mode, it is preferred that the control function is a user alert function to notify the user of the low average image luminance level.

This invention also provides a data processing method comprising the steps of:

receiving successive images from a video camera;

detecting the average image luminance of images received from the video camera;

detecting whether the average image luminance is lower than a threshold luminance value; and initiating a control function of the data processing apparatus in response to detection of an average image luminance which is lower than the threshold luminance value over at least a threshold number of successive images.

This invention also provides computer software having program code for carrying out a method as above. The computer software is preferably provided by a providing medium such as a transmission medium or a storage medium.

Further respective aspects and features of the invention are defined in the appended claims.

Figure 2:
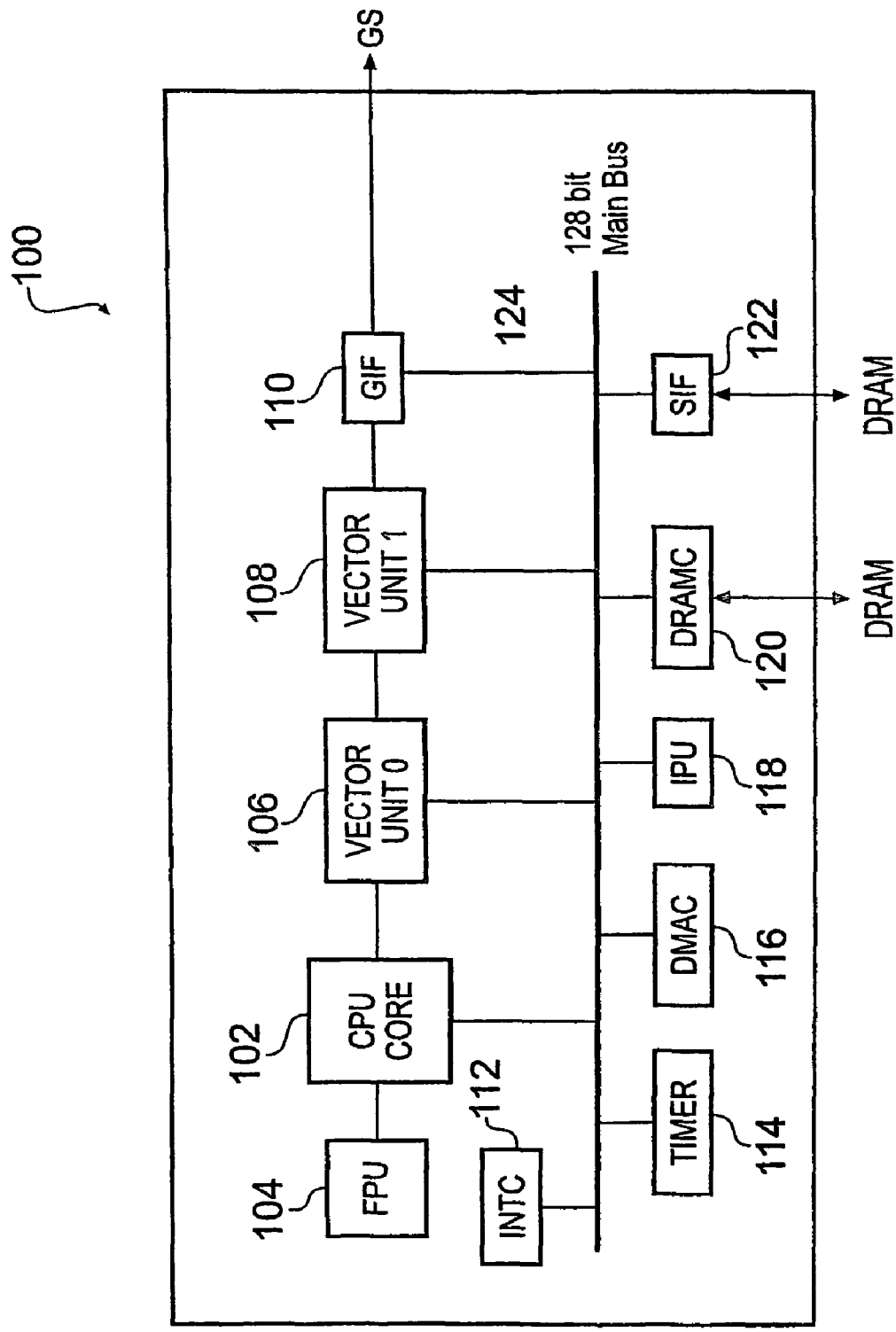
Figure 3:
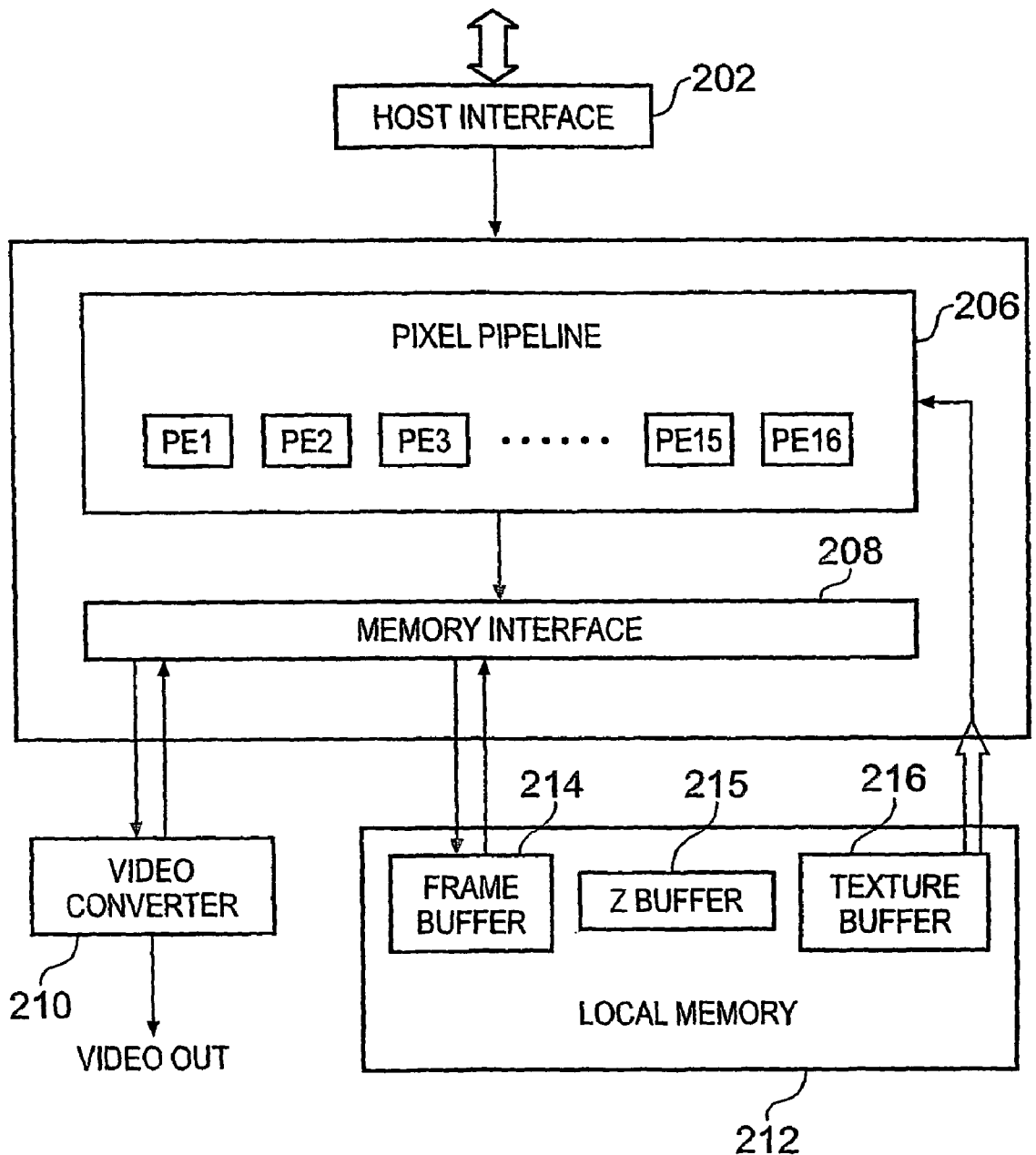
Figure 4:
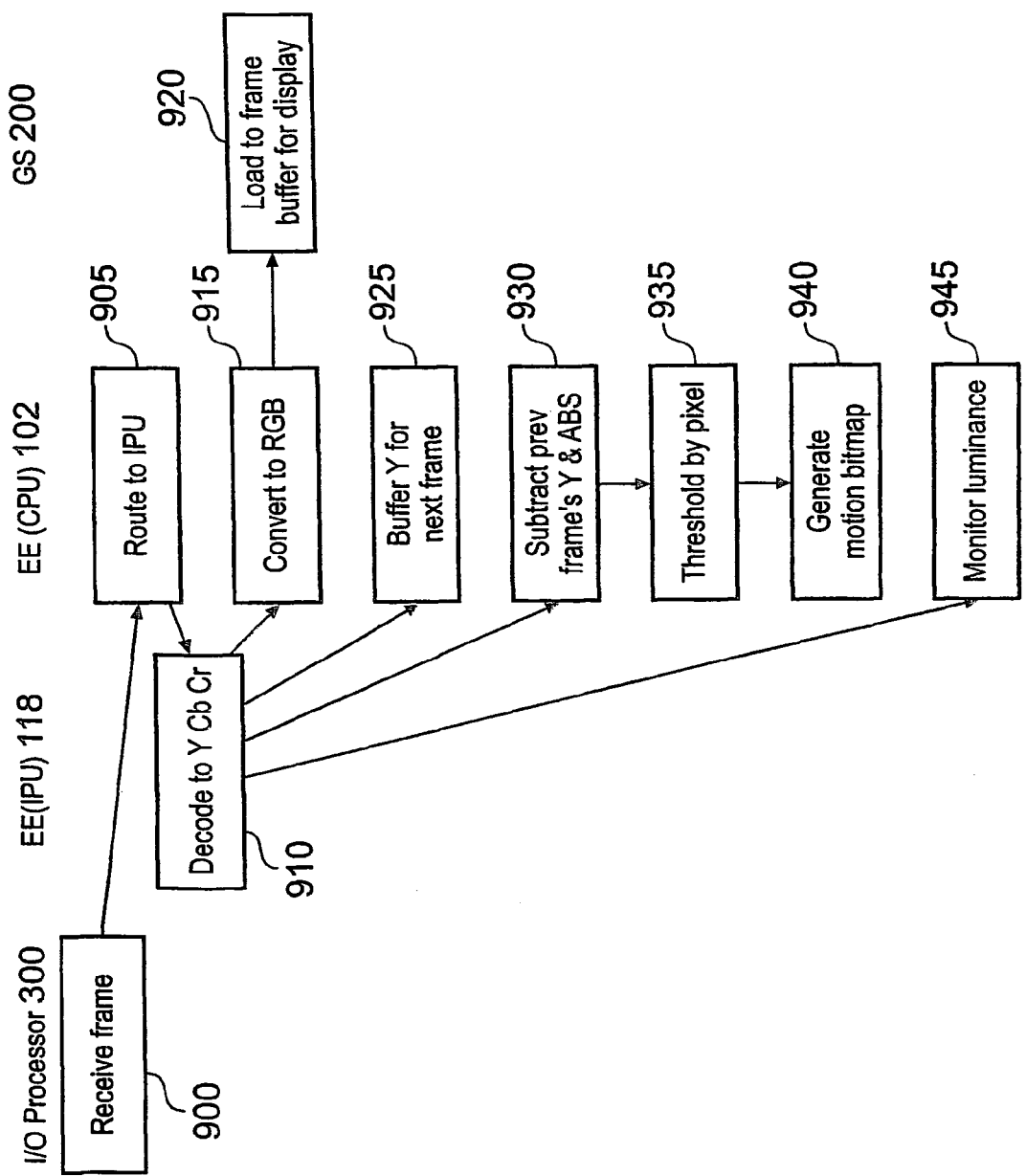
Figure 5:
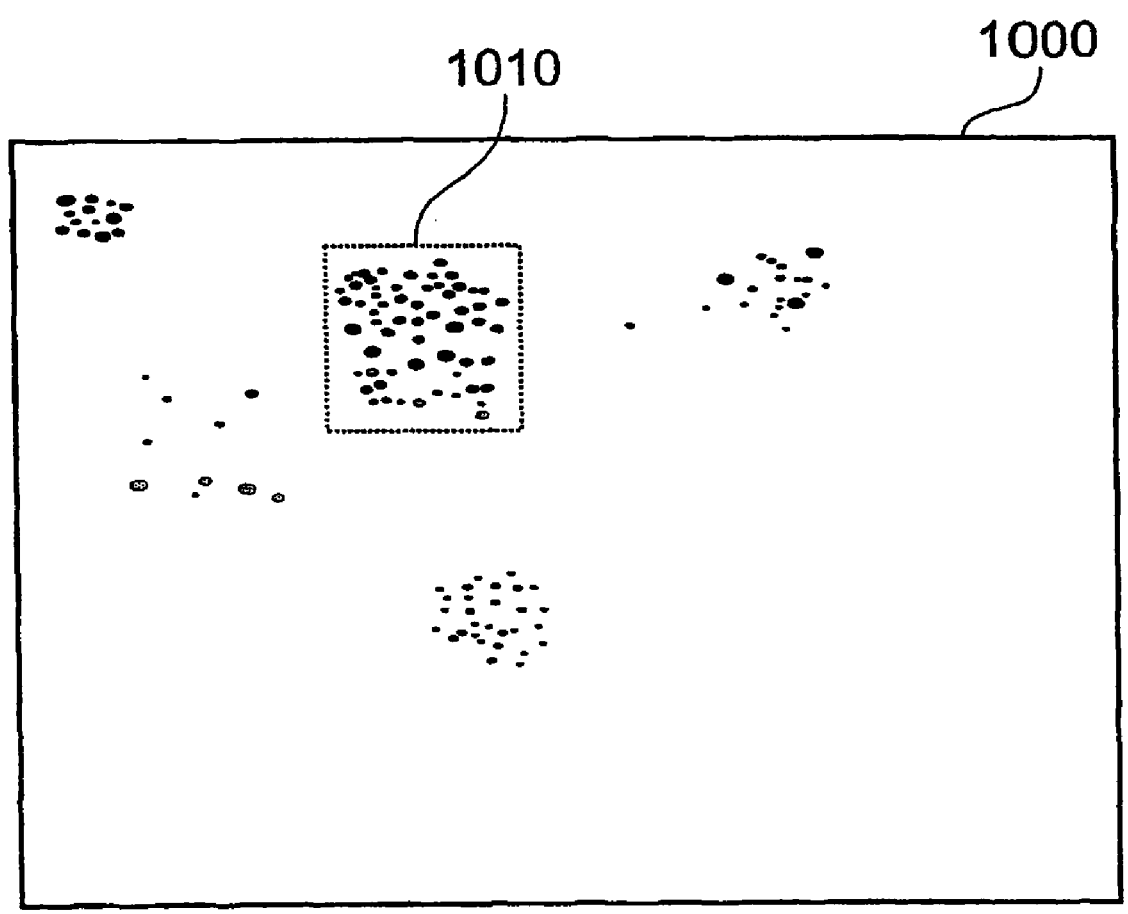
Figure 6:
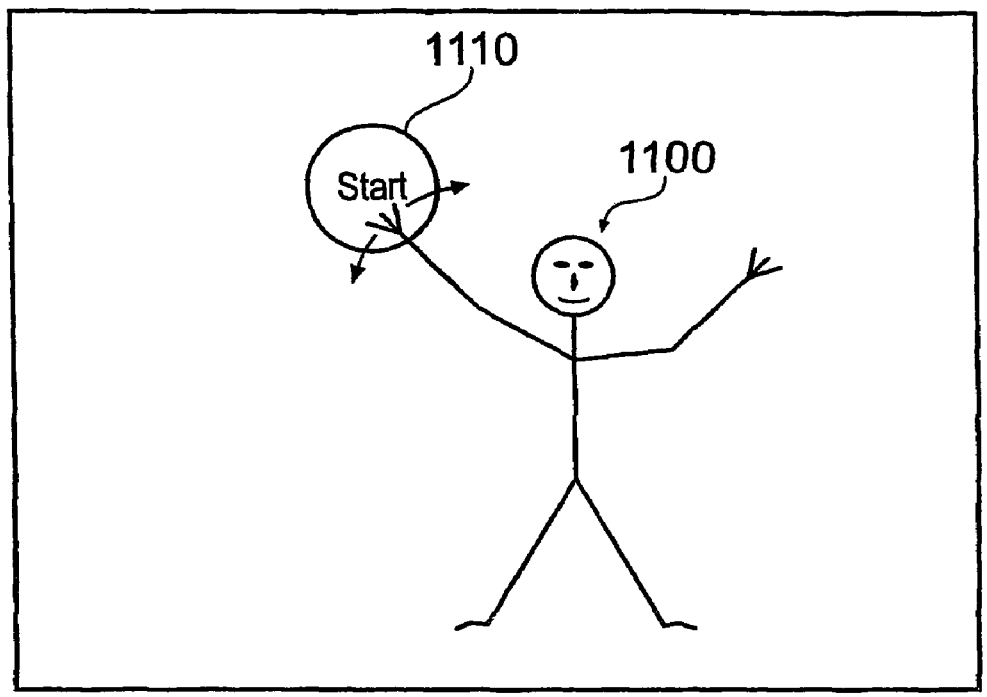
Figure 7:
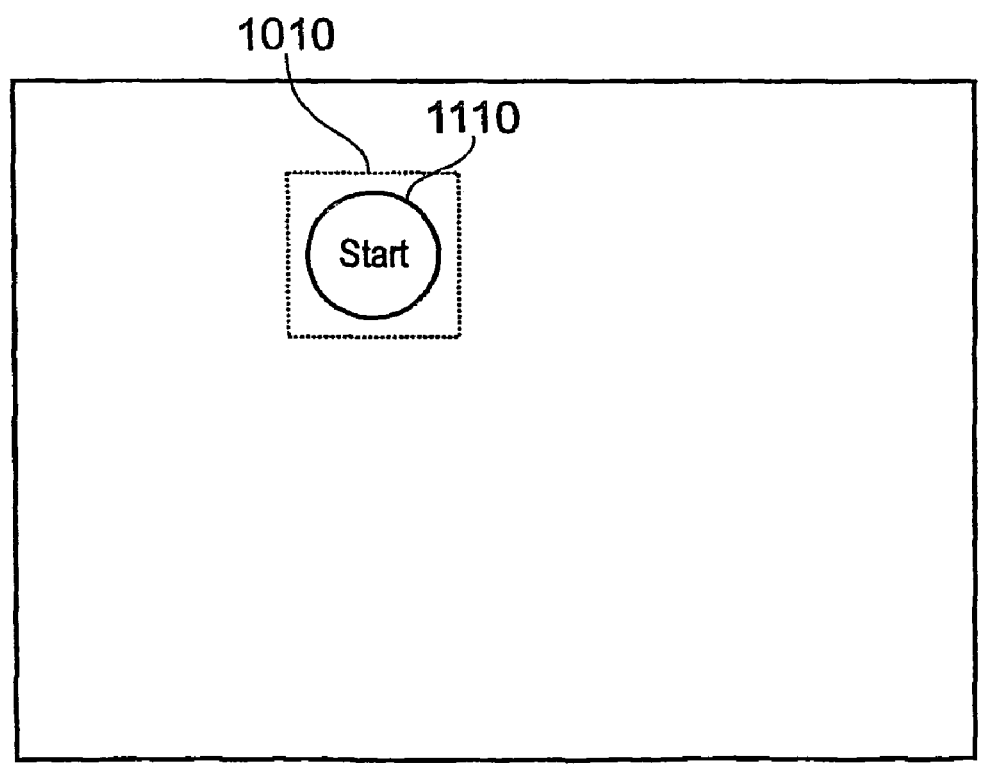
Figure 8:
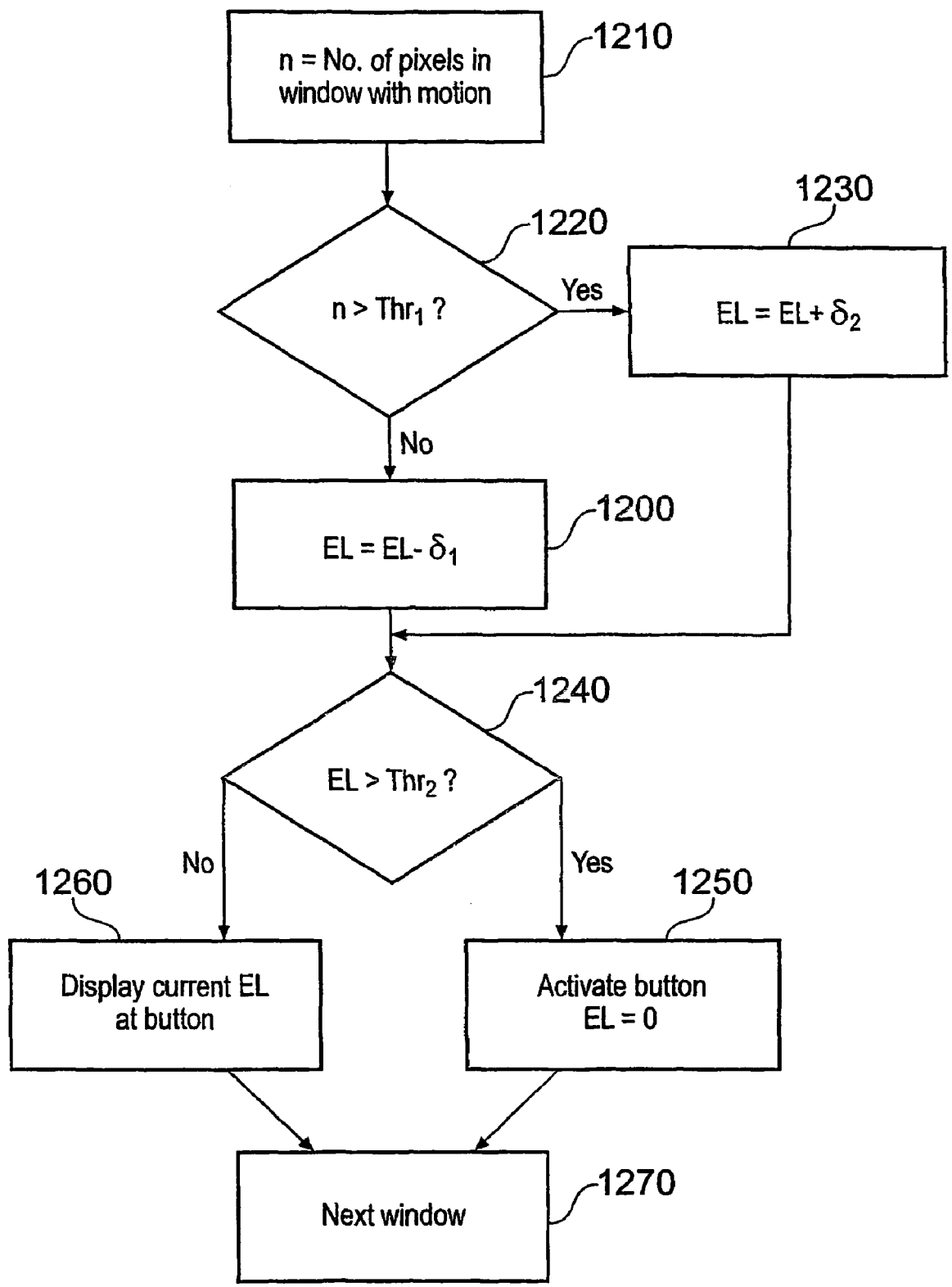
Figure 9A:
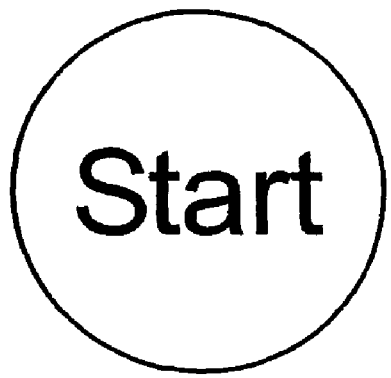
Figure 9B:
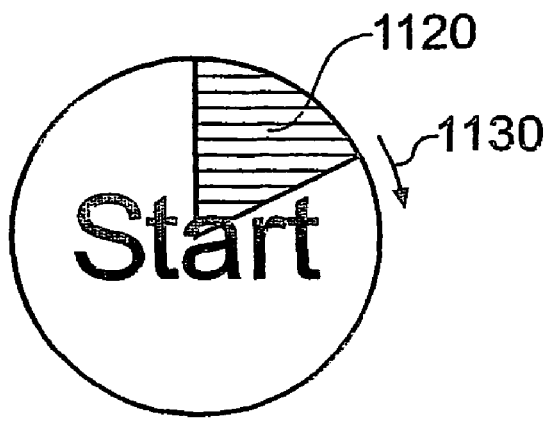
Figure 9C:
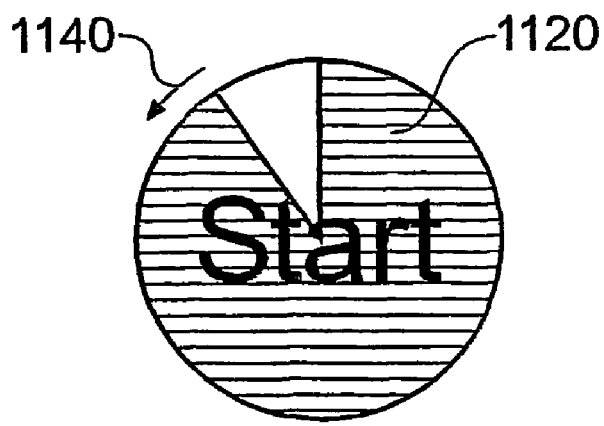
Figure 10A:
Figure 10B:
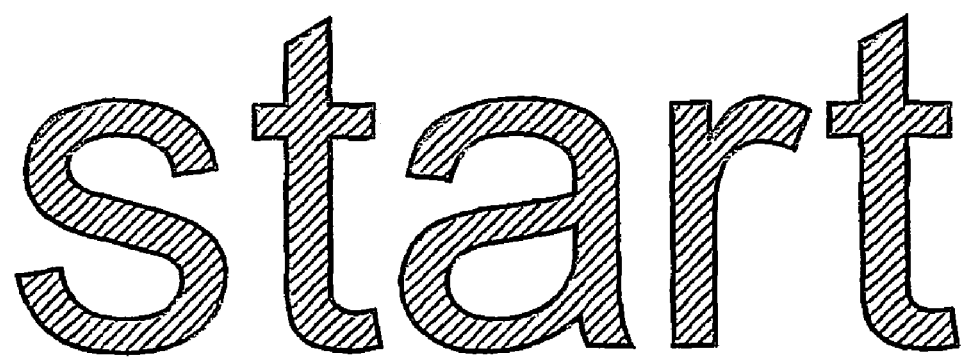
Figure 10C:
Figure 11:
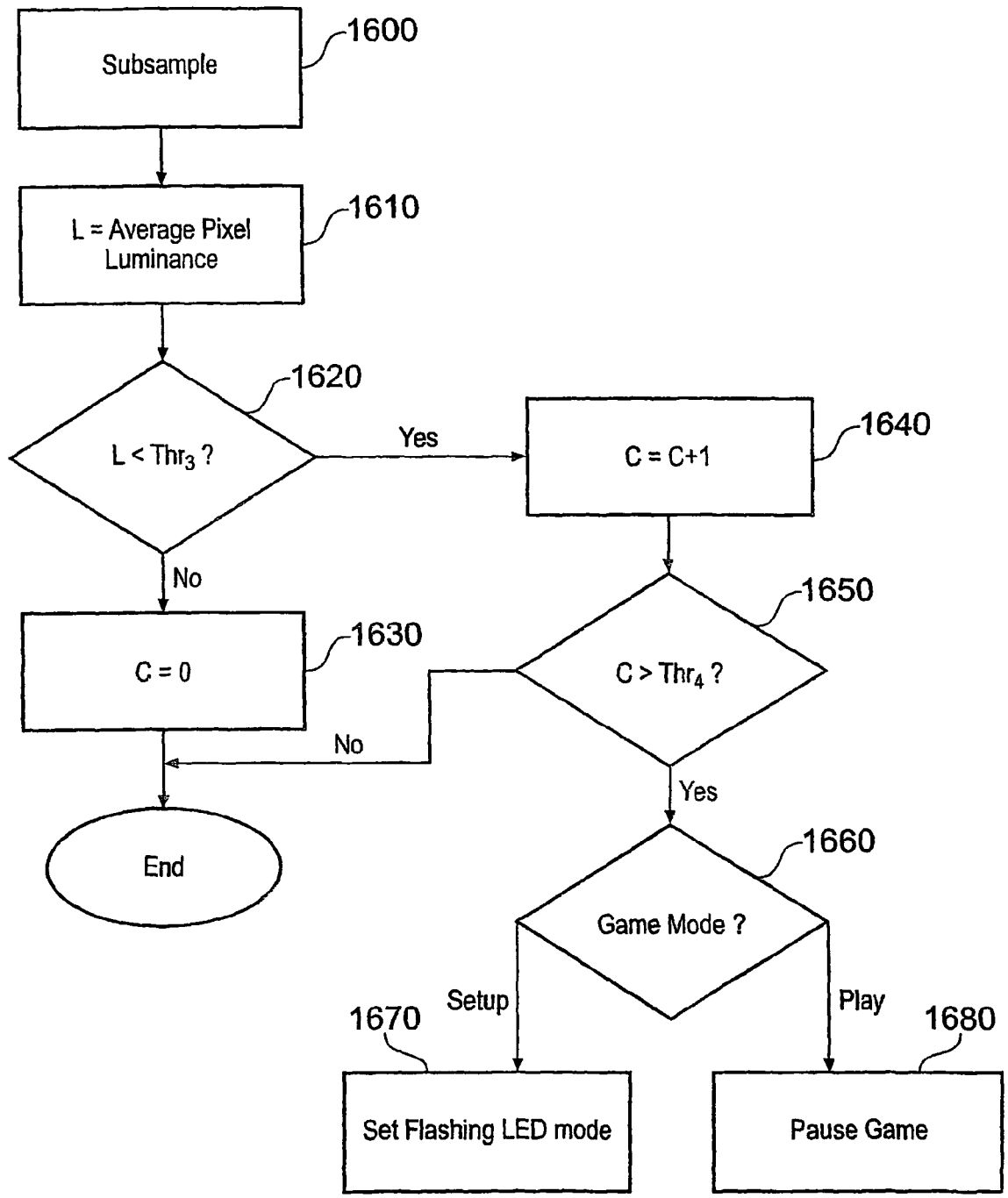
Figure 12:
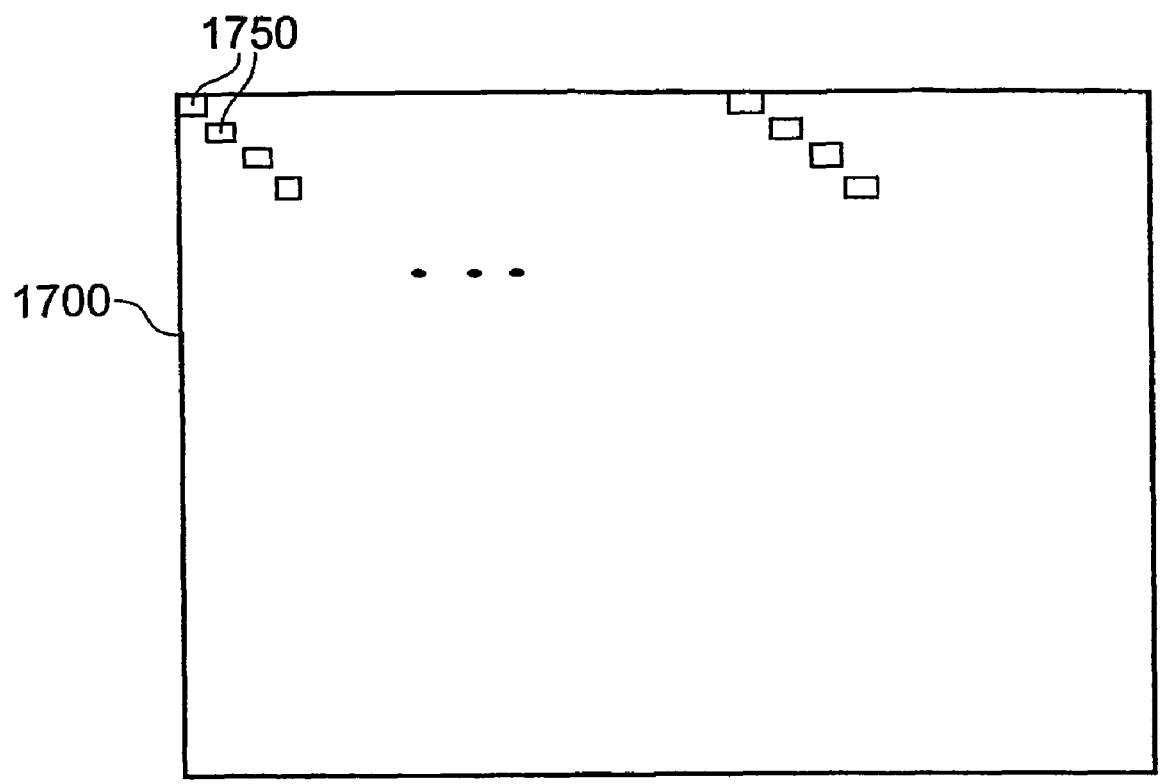

Embodiments of the invention will now be described, by way of example only, with reference to the accompanying drawings in which:

FIG. 1 schematically illustrates the overall system architecture of the PlayStation2;

FIG. 2 schematically illustrates the architecture of an Emotion Engine;

FIG. 3 schematically illustrates the configuration of a Graphic synthesiser;

FIG. 4 is a schematic flowchart illustrating the generation of a motion bitmap;

FIG. 5 schematically illustrates a motion bitmap;

FIG. 6 schematically illustrates a screen display;

FIG. 7 schematically illustrates a button window;

FIG. 8 is a schematic flowchart illustrating the activation of a button;

FIGS. 9a to 9c schematically illustrate a button display;

FIGS. 10a to 10c schematically illustrate another format of button display;

FIG. 11 is a schematic flowchart illustrating the monitoring of camera luminance;

FIG. 12 schematically illustrates a subsampled image; and

Figure 13:
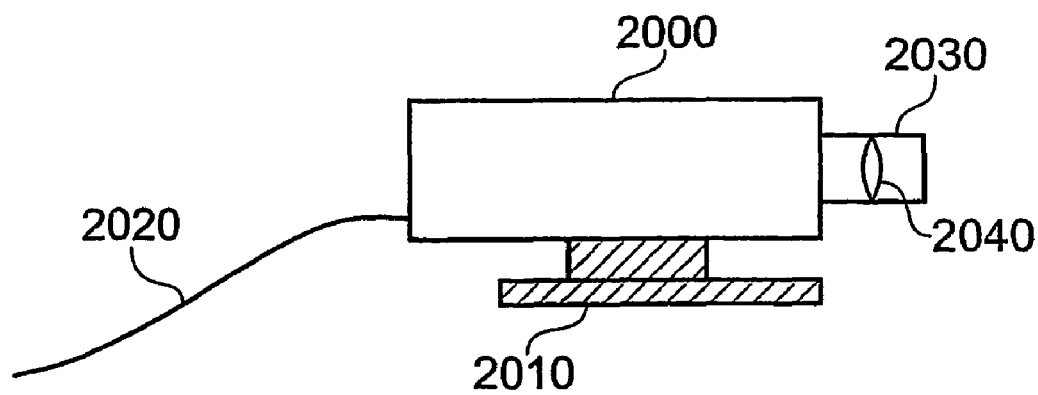

FIG. 13 schematically illustrates a camera.

FIG. 1 schematically illustrates the overall system architecture of the PlayStation2. A system unit 10 is provided, with various peripheral devices connectable to the system unit.

The system unit 10 comprises: an Emotion Engine 100; a Graphics Synthesiser 200; a sound processor unit 300 having dynamic random access memory (DRAM); a read only memory (ROM) 400; a compact disc (CD) and digital versatile disc (DVD) reader 450; a Rambus Dynamic Random Access Memory (RDRAM) unit 500; an input/output processor (IOP) 700 with dedicated RAM 750. An (optional) external hard disk drive (HDD) 800 may be connected.

The input/output processor 700 has two Universal Serial Bus (USB) ports 715 and an iLink or IEEE 1394 port (iLink is the Sony Corporation implementation of IEEE 1394 standard). The IOP 700 handles all USB, iLink and game controller data traffic. For example when a user is playing a game, the IOP 700 receives data from the game controller and directs it to the Emotion Engine 100 which updates the current state of the game accordingly. The IOP 700 has a Direct Memory Access (DMA) architecture to facilitate rapid data transfer rates. DMA involves transfer of data from main memory to a device without passing it through the CPU. The USB interface is compatible with Open Host Controller Interface (OHCI) and can handle data transfer rates of between 1.5 Mbps and 12 Mbps. Provision of these interfaces mean that the PlayStation2 is potentially compatible with peripheral devices such as video cassette recorders (VCRs), digital cameras, set-top boxes, printers, keyboard, mouse and joystick.

Generally, in order for successful data communication to occur with a peripheral device connected to a USB port 715, an appropriate piece of software such as a device driver should be provided. Device driver technology is very well known and will not be described in detail here, except to say that the skilled man will be aware that a device driver or similar software interface may be required in the embodiment described here.

In the present embodiment, a video camera 730 with an associated microphone 735 and an LED indicator 740 is connected to the USB port. Although various types of video camera may be used, a particularly suitable type of video camera 735 is a so-called "webcam", that is, a medium-resolution camera based on a single charge-coupled device (CCD) element and including a basic hardware-based real-time data compression and encoding arrangement, so that compressed video and audio data are transmitted by the camera 730 to the USB port 715 in an appropriate format, such as an intra-image based MPEG (Motion Picture Expert Group) standard, for decoding at the PlayStation 2 system unit 10.

The camera LED indicator 740 is arranged to receive control data via the USB data connection to the system unit 10. The CPU 102 can send a control signal via this route to set the LED to an "off" mode, a "steady on" mode and a "flashing" mode in which the LED flashes at a rate of between, say, 1 and 3 flashes per second. The logic required to cause the LED to flash is provided in the camera circuitry, so it is not necessary for the system unit 10 to instruct each individual flash of the LED.

A suitable camera is shown schematically in side elevation in FIG. 13, and comprises a camera body 2000 housing a CCD element and associated electronics (not shown), a tilt/swivel stand 2010, a cable 2020 to connect to the USB port of the PlayStation 2, and a focus ring or lens housing 2030 which houses a lens 2040. The focus ring may be rotated by the user to adjust the focus of the lens 2040 with respect to the CCD element, that is, to adjust the focus of the camera. The focus ring has a diameter such that it can be covered by a user's finger, and protrudes beyond the lens so that if the lens is indeed covered by a finger, the finger will generally not touch the optical surface of the lens 2040.

Apart from the USB ports, two other ports 705, 710 are proprietary sockets allowing the connection of a proprietary non-volatile RAM memory card 720 for storing game-related information, a hand-held game controller 725 or a device (not shown) mimicking a hand-held controller, such as a dance mat.

The Emotion Engine 100 is a 128-bit Central Processing Unit (CPU) that has been specifically designed for efficient simulation of 3 dimensional (3D) graphics for games applications. The Emotion Engine components include a data bus, cache memory and registers, all of which are 128-bit. This facilitates fast processing of large volumes of multi-media data. Conventional PCs, by way of comparison, have a basic 64-bit data structure. The floating point calculation performance of the PlayStation2 is 6.2 GFLOPs. The Emotion Engine also comprises MPEG2 decoder circuitry which allows for simultaneous processing of 3D graphics data and DVD data. The Emotion Engine performs geometrical calculations including mathematical transforms and translations and also performs calculations associated with the physics of simulation objects, for example, calculation of friction between two objects. It produces sequences of image rendering commands which are subsequently utilised by the Graphics Synthesiser 200. The image rendering commands are output in the form of display lists. A display list is a sequence of drawing commands that specifies to the Graphics Synthesiser which primitive graphic objects (e.g. points, lines, triangles, sprites) to draw on the screen and at which co-ordinates. Thus a typical display list will comprise commands to draw vertices, commands to shade the faces of polygons, render bitmaps and so on. The Emotion Engine 100 can asynchronously generate multiple display lists.

The Graphics Synthesiser 200 is a video accelerator that performs rendering of the display lists produced by the Emotion Engine 100. The Graphics Synthesiser 200 includes a graphics interface unit (GIF) which handles, tracks and manages the multiple display lists. The rendering function of the Graphics Synthesiser 200 can generate image data that supports several alternative standard output image formats, i.e., NTSC/PAL, High Definition Digital TV and VESA. In general, the rendering capability of graphics systems is defined by the memory bandwidth between a pixel engine and a video memory, each of which is located within the graphics processor. Conventional graphics systems use external Video Random Access Memory (VRAM) connected to the pixel logic via an off-chip bus which tends to restrict available bandwidth. However, the Graphics Synthesiser 200 of the PlayStation2 provides the pixel logic and the video memory on a single high-performance chip which allows for a comparatively large 38.4 Gigabyte per second memory access bandwidth. The Graphics Synthesiser is theoretically capable of achieving a peak drawing capacity of 75 million polygons per second. Even with a full range of effects such as textures, lighting and transparency, a sustained rate of 20 million polygons per second can be drawn continuously. Accordingly, the Graphics Synthesiser 200 is capable of rendering a film-quality image.

The Sound Processor Unit (SPU) 300 is effectively the soundcard of the system which is capable of recognising 3D digital sound such as Digital Theater Surround (DTS®)) sound and AC-3 (also known as Dolby Digital) which is the sound format used for digital versatile disks (DVDs).

A display and sound output device 305, such as a video monitor or television set with an associated loudspeaker arrangement 310, is connected to receive video and audio signals from the graphics synthesiser 200 and the sound processing unit 300.

The main memory supporting the Emotion Engine 100 is the RDRAM (Rambus Dynamic Random Access Memory) module 500 produced by Rambus Incorporated. This RDRAM memory subsystem comprises RAM, a RAM controller and a bus connecting the RAM to the Emotion Engine 100.

FIG. 2 schematically illustrates the architecture of the Emotion Engine 100 of FIG. 1. The Emotion Engine 100 comprises: a floating point unit (FPU) 104; a central processing unit (CPU) core 102; vector unit zero (VU0) 106; vector unit one (VU1) 108; a graphics interface unit (GIF) 110; an interrupt controller (INTC) 112; a timer unit 114; a direct memory access controller 116; an image data processor unit (IPU) 116; a dynamic random access memory controller (DRAMC) 120; a sub-bus interface (SIF) 122; and all of these components are connected via a 128-bit main bus 124.

The CPU core 102 is a 128-bit processor clocked at 300 MHz. The CPU core has access to 32 MB of main memory via the DRAMC 120. The CPU core 102 instruction set is based on MIPS III RISC with some MIPS IV RISC instructions together with additional multimedia instructions. MIPS III and IV are Reduced Instruction Set Computer (RISC) instruction set architectures proprietary to MIPS Technologies, Inc. Standard instructions are 64-bit, two-way superscalar, which means that two instructions can be executed simultaneously. Multimedia instructions, on the other hand, use 128-bit instructions via two pipelines. The CPU core 102 comprises a 16 KB instruction cache, an 8 KB data cache and a 16 KB scratchpad RAM which is a portion of cache reserved for direct private usage by the CPU.

The FPU 104 serves as a first co-processor for the CPU core 102. The vector unit 106 acts as a second co-processor. The FPU 104 comprises a floating point product sum arithmetic logic unit (FMAC) and a floating point division calculator (FDIV). Both the FMAC and FDIV operate on 32-bit values so when an operation is carried out on a 128-bit value (composed of four 32-bit values) an operation can be carried out on all four parts concurrently.

The vector units 106 and 108 perform mathematical operations and are essentially specialised FPUs that are extremely fast at evaluating the multiplication and addition of vector equations. They use Floating-Point Multiply-Adder Calculators (FMACs) for addition and multiplication operations and Floating-Point Dividers (FDIVs) for division and square root operations. They have built-in memory for storing microprograms and interface with the rest of the system via Vector Interface Units (VIFs). Vector Unit Zero 106 can work as a coprocessor to the CPU core 102 via a dedicated 128-bit bus 124 so it is essentially a second specialised FPU. Vector Unit One 108, on the other hand, has a dedicated bus to the Graphics synthesiser 200 and thus can be considered as a completely separate processor. The inclusion of two vector units allows the software developer to split up the work between different parts of the CPU and the vector units can be used in either serial or parallel connection.

Vector unit zero 106 comprises 4 FMACS and 1 FDIV. It is connected to the CPU core 102 via a coprocessor connection. It has 4 Kb of vector unit memory for data and 4 Kb of micro-memory for instructions. Vector unit zero 106 is useful for performing physics calculations associated with the images for display. It primarily executes non-patterned geometric processing together with the CPU core 102.

Vector unit one 108 comprises 5 FMACS and 2 FDIVs. It has no direct path to the CPU core 102, although it does have a direct path to the GIF unit 110. It has 16 Kb of vector unit memory for data and 16 Kb of micro-memory for instructions. Vector unit one 108 is useful for performing transformations. It primarily executes patterned geometric processing and directly outputs a generated display list to the GIF 110.

The GIF 110 is an interface unit to the Graphics Synthesiser 200. It converts data according to a tag specification at the beginning of a display list packet and transfers drawing commands to the Graphics Synthesiser 200 whilst mutually arbitrating multiple transfer. The interrupt controller (INTC) 112 serves to arbitrate interrupts from peripheral devices, except the DMAC 116.

The timer unit 114 comprises four independent timers with 16-bit counters. The timers are driven either by the bus clock (at 1/16 or 1/256 intervals) or via an external clock. The DMAC 116 handles data transfers between main memory and peripheral processors or main memory and the scratch pad memory. It arbitrates the main bus 124 at the same time. Performance optimisation of the DMAC 116 is a key way by which to improve Emotion Engine performance. The image processing unit (IPU) 118 is an image data processor that is used to expand compressed animations and texture images. It performs I-PICTURE Macro-Block decoding, colour space conversion and vector quantisation. Finally, the sub-bus interface (SIF) 122 is an interface unit to the IOP 700. It has its own memory and bus to control I/O devices such as sound chips and storage devices.

FIG. 3 schematically illustrates the configuration of the Graphic Synthesiser 200. The Graphics Synthesiser comprises: a host interface 202; a set-up/rasterizing unit 204; a pixel pipeline 206; a memory interface 208; a local memory 212 including a frame page buffer 214 and a texture page buffer 216; and a video converter 210.

The host interface 202 transfers data with the host (in this case the CPU core 102 of the Emotion Engine 100). Both drawing data and buffer data from the host pass through this interface. The output from the host interface 202 is supplied to the graphics synthesiser 200 which develops the graphics to draw pixels based on vertex information received from the Emotion Engine 100, and calculates information such as RGBA value, depth value (i.e. Z-value), texture value and fog value for each pixel. The RGBA value specifies the red, green, blue (RGB) colour components and the A (Alpha) component represents opacity of an image object. The Alpha value can range from completely transparent to totally opaque. The pixel data is supplied to the pixel pipeline 206 which performs processes such as texture mapping, fogging and Alpha-blending (as explained below) and determines the final drawing colour based on the calculated pixel information.

The pixel pipeline 206 comprises 16 pixel engines PE1, PE2 . . . PE16 so that it can process a maximum of 16 pixels concurrently. The pixel pipeline 206 runs at 150 MHz with 32-bit colour and a 32-bit Z-buffer. The memory interface 208 reads data from and writes data to the local Graphics Synthesiser memory 212. It writes the drawing pixel values (RGBA and Z) to memory at the end of a pixel operation and reads the pixel values of the frame buffer 214 from memory. These pixel values read from the frame buffer 214 are used for pixel test or Alpha-blending. The memory interface 208 also reads from local memory 212 the RGBA values for the current contents of the frame buffer. The local memory 212 is a 32 Mbit (4 MB) memory that is built-in to the Graphics Synthesiser 200. It can be organised as a frame buffer 214, texture buffer 216 and a 32-bit Z-buffer 215. The frame buffer 214 is the portion of video memory where pixel data such as colour information is stored.

The Graphics Synthesiser uses a 2D to 3D texture mapping process to add visual detail to 3D geometry. Each texture may be wrapped around a 3D image object and is stretched and skewed to give a 3D graphical effect. The texture buffer is used to store the texture information for image objects. The Z-buffer 215 (also known as depth buffer) is the memory available to store the depth information for a pixel. Images are constructed from basic building blocks known as graphics primitives or polygons. When a polygon is rendered with Z-buffering, the depth value of each of its pixels is compared with the corresponding value stored in the Z-buffer. If the value stored in the Z-buffer is greater than or equal to the depth of the new pixel value then this pixel is determined visible so that it should be rendered and the Z-buffer will be updated with the new pixel depth. If however the Z-buffer depth value is less than the new pixel depth value the new pixel value is behind what has already been drawn and will not be rendered.

The local memory 212 has a 1024-bit read port and a 1024-bit write port for accessing the frame buffer and Z-buffer and a 512-bit port for texture reading. The video converter 210 is operable to display the contents of the frame memory in a specified output format.

FIG. 4 is a schematic flow chart illustrating the handling of image data from the camera, including the generation of a motion bitmap. A motion bit map is used in the techniques to be described below, which allow control of various data processing functions of the PlayStation 2 system unit 10 via movements of the user in front of the camera 730.

The steps illustrated in FIG. 4 are carried out by various different parts of the system. In general terms these are: the IOP 700, the Emotion Engine (IPU) 118, the Emotion Engine (CPU) 102 and the graphics synthesiser 200. FIG. 4 is arranged as four columns, each column corresponding to operations carried out by one of these parts.

The steps shown in FIGS. 4, 8 and 11 are carried out under control of software stored on a DVD disk and read by the reader 450, although software received over a network connection such as an internet connection (not shown) may be used instead. They are repeated for each image (e.g., a progressive-scanned frame) received from the camera 730. The image rate may be set within the operating software of the PlayStation 2 system unit 10. An example image rate which may be suitable is a rate of 50 frames per second.

At a step 900, the IOP 700 receives data from the camera 730 corresponding to one frame. As mentioned above, this data is in a compressed form such as an intra-image MPEG format. At a step 905, the Emotion Engine 100 reads the frame's worth of image data from the IOP and routes it to the IPU 118.

At a step 910, the IPU 118 decodes the MPEG-encoded image data into a luminance-chrominance (Y, Cb, Cr) format. The Y, Cb, Cr representation of the image is then handled in four different ways by the Emotion Engine's CPU 102.

At a step 915, the CPU 102 converts the Y, Cb, Cr format data into component (red, green, blue, or RGB) data. The RGB data is passed to the GS 200 which stores the frame in the frame buffer 124 for display (step 920). In the course of the operation of the current game software, it is very likely that the frame of data from the video camera will either be manipulated in some form or will be over-written or overlaid in places by synthesised image data.

A second use of the Y, Cb, Cr data decoded at the step 910 is that at a step 925, the luminance (Y) component is buffered in the RAM 500 for use in connection with the next frame received from the camera 730. The use of this buffered luminance data will become apparent from the following description.

A third use of the Y, Cb, Cr data decoded at the step 910 takes place at a step 930, in which the current frame's luminance (Y) data is subtracted, on a pixel-by-pixel basis, from the buffered luminance data in respect of the preceding frame. An "absolute value" function is applied so that the luminance difference between corresponding pixels of the current and previous frame is established as a set of positive numbers.

At a step 935, the luminance difference is compared with a threshold value, again on a pixel-by-pixel basis. If the luminance difference for a particular pixel position exceeds the threshold value then it is determined that motion took place at that pixel position. If the luminance difference does not exceed the threshold value, it is determined that motion did not take place at that pixel position. In this way, at a step 940, a "motion bit map" is generated, so that each pixel position has an associated flag indicating whether motion was detected at that pixel position.

The motion bit map is stored in the RAM 500. It will be apparent that the motion bit map could be stored in a one-bit-per-pixel format. However, for ease of addressing, the present embodiment actually stores the motion bit map as a 16 bit-per-pixel format, but the underlying information stored in this manner is simply a flag for each pixel indicating either "motion" or "no motion".

One use that may be made of the motion bit map is to allow the user to control data processing operations by initiating motion at a particular part of the image. In order for the user to do this, it is preferred that the image from the webcam is displayed on the display 305. This may be as a full-screen display or as a part of the screen, possibly with some manipulation such as scaling. The main thing, however, is to allow the user to see at least a part of the field of view of the camera 730, so that the user can tell when he is initiating image motion at the correct part of the image. The example images to be described with reference to FIGS. 6 and 7 below assume that a full-screen version of substantially the full field of view of the camera 730 is provided, albeit with some image overlays.

A fourth use of the Y, Cb, Cr data decoded at the step 910 is that at a step 945, the luminance (Y) component is used as the basis of a monitoring process, to monitor the average luminance of each image and to control operation of the PlayStation 2 in dependence upon that average luminance.

FIG. 5 schematically illustrates a motion bit map. The bit map is shown as a rectangular array 1000 of pixel flags, which are located, for the purposes of the illustration, at positions in the array corresponding to the spatial position of that pixel in the image. However, it will be appreciated that this is merely a schematic view of the motion bit map. In practice, an appropriate memory area having the same number of memory entries (e.g., addressable data words or sub-divisions of addressable data words) as the number of pixels in the image is required.

In FIG. 5, a pixel position at which motion was detected is shown schematically as a dark dot. A test window 1010 is also illustrated in dotted line. The purpose of the test window, which preferably represents a subset of the image, and which may be at a predetermined position within the image, will be described below.

FIG. 6 schematically illustrates a screen display. As mentioned above, this is a full-screen representation of the full field of view of the camera 730. A user 1100 is standing in the field of view of the camera 730. The user sees a "start button" 1110 displayed on the display screen 305, as a semi-transparent or opaque overlay to the image from the camera 730. The purpose of the "start button" 1110 is to start the operation of a particular part of a game program running on the PlayStation 2. (It will of course be appreciated that "start" is just one of many controls and options appropriate to the playing of software-based games).

In order to activate the start button 1110, in other words to cause the PlayStation 2 to start the game software described above, the user causes image motion to occur in the image area defined by the start button. A convenient way for the user to do this is to wave his hand at that screen position. The motion caused by the waving of the user's hand is detected using a technique to be described below.

FIG. 7 schematically illustrates the way in which the test window 1010 surrounds the position corresponding to the start button 1110. In this way, although the user is expected to cause image motion within the visible outline on the display screen 305 of the start button 1110, in fact the corresponding function will be activated if the user causes an appropriate amount of image motion within the test window 1010. Of course, the boundary of the test window 1010 is normally invisible to the user.

FIG. 8 is a schematic flow chart illustrating the activation of a control function, for example the function represented by the "start button" 1110. Underlying the technique shown in FIG. 8 is a need for the user to cause image motion over a period longer than one inter-frame period. This is to avoid spurious activations of the button by either short-duration image motion or image artefacts caused, for example, by a change in lighting or the like. However, a short gap in the detected motion—perhaps caused by the user's hand momentarily moving out of the test window or by an incorrect output of the motion detection algorithm—need not mean that the user has to restart the activation process from the beginning.

A variable referred to as "energy level" (EL) is maintained in respect of each control button currently displayed on the screen. The operations of FIG. 8 modify the variable EL and compare it with a threshold. These operations take place in respect of each frame received from the camera 730. When the system is first booted, EL is set to an initial value of zero in respect of each test window. Also, when a new test window is established at any time, EL for that test window is set to zero.

Referring to FIG. 8, at a step 1210, a detection is made of the number of pixels having a motion flag set to indicate "motion" lying within the test window 1010 corresponding to a control button 1110 under consideration.

At a step 1220, this number, n, is compared with a first threshold value $Thr_1$. The threshold value $Thr_1$ is set as a proportion of the total number of pixels lying within the test window 1010. For example, the threshold $Thr_1$ may be set to 40% of the total number of pixels lying within the test window.

If n is greater than $Thr_1$ then the variable EL is increased by an amount $\delta 2$ at a step 1230. The increment $\delta 2$ is arranged to be greater than the size of the decrement $\delta 1$ of the step 1200. Preferably, $\delta 2=0.025$ and $\delta 1=0.01$. Control then passes to a step 1240.

Returning to the step 1220, if the number n was not greater than $Thr_1$ then at a step 1200, EL is reduced by an amount $\delta 1$, subject to the constraint that EL does not go below zero. Control passes to the step 1240.

At the step 1240, the energy level EL is compared with a second threshold amount $Thr_2$. If the energy level is greater than $Thr_2$ then at a step 1250 the button under consideration is activated and the variable EL, in respect of that button, is reset to zero. The process then repeats in respect of a next test window. If, however, at the step 1240 it is found that the energy level is not greater than $Thr_2$, then at a step 1260 the current value of the variable EL is displayed in a schematic way at the screen button 1110. Examples of this will be described with reference to 9a to 9c and 10a to 10c. Control then passes to the step 1270 where a next test window is considered.

The variable $Thr_2$ is preferably set so that the user has to cause 1 second of continuous motion in order to activate the button. In other words, assuming a 50 frames per second system:

continuous motion activation time=$Thr_2/(50.\delta 2)=1$ seconds so that $Thr_2$ is equal to 1.25.

Of course, if there are interruptions in the motion detected at the test window, the period may be longer because of the effects of the decrement at the step 1200. An optional exception to this is as follows. Within the first m frame periods after activation of a button, the threshold $Thr_2$ applying to that button can be set to a lower value, such as a half of its "normal" value. This makes a repeated series of activations by the user a little more convenient, as subsequent activations immediately after the first one take a shorter period of motion. During a repeated sequence of activations, each time the button is activated the value $Thr_2$ is again held at the reduced value for a further m frame periods. Preferably, the value m is such that m frame periods lasts for about twice the time period for normal activation using continuous motion. So:

$$m=2.Thr_2/\delta 2$$

Where the variable EL exceeds the threshold $Thr_2$, so that the button is activated at the step 1250, a software message is communicated to the game software which is equivalent to the message which would be transmitted to the game software if the user had pressed a physical "start" button on a hand held controller 725. Thereafter, the game software executes the "start" instruction. In other words, apart from the manner of detecting the user input, the software handles the "start" instruction independently of whether the instruction was initiated by a physical button or by the user activating a screen button.

FIGS. 9a to 9c schematically illustrate an example of a button display. FIG. 9a illustrates a situation where the variable EL is zero, which is to say that the user has not been causing image motion at that screen position. FIG. 9b illustrates a situation where EL is above zero but still well below the threshold amount $Thr_2$. A segment 1120 of the start button is displayed in a different colour or texture (or both). For the purposes of FIG. 9b, the segment 1120 is shown as a shaded portion. As the value of the variable EL grows towards $Thr_2$, so the size of the segment 1120 increases in a direction shown by the arrow 1130. Accordingly, FIG. 9c schematically illustrates the situation where the variable EL has almost reached the threshold value $Thr_2$. Of course, if the user stops causing motion at the test window corresponding to the screen button shown in FIGS. 9a to 9c, the size of the segment 1120 will start to decrease in a direction shown by the arrow 1140. This will correspond to the decay of the variable EL by the amount $\delta 1$ at each frame period (step 1200) in which motion is not detected at that test window.

FIGS. 10a to 10c schematically illustrate another technique for providing visual feedback to the user of the state of the variable EL. As before, FIG. 10a illustrates the situation where EL is zero. Wording associated with the screen button, in this example the word "start", is shown in an outline font or a font of a first colour. As the value of EL increases in response to user motion at the test window, the display attributes of the wording change. In FIGS. 10b and 10c these changes are illustrated by a darkening of the font, but any colour, texture, saturation, intensity or other display change may be used.

FIG. 11 is a schematic flow chart illustrating the monitoring of camera luminance. The process of FIG. 11 corresponds to the step 945 in FIG. 4.

At a step 1600, the luminance data Y associated with the current frame is sub-sampled. This is carried out quite simply by reading a pixel value, skipping a number n of pixels (e.g. 99 pixels), reading a next pixel value, skipping n pixels and so on. This process is shown schematically in FIG. 12 where the sub-sampled pixels 1750 are illustrated within a schematic representation of a frame 1700.

At a step 1610, the average pixel luminance, L, is derived from the group of sub-sampled pixels. In other words, L is the sum of the luminance of the group of subsampled pixels divided by the number of pixels in that group.

At a step 1620, the value L is compared with a third threshold value, $Thr_3$. If L is not less than $Thr_3$ then control passes to a step 1630 where a counter value C is set to zero and the process, in respect of the current frame, ends.

However, if L is less than the threshold value $Thr_3$, for example because the user is covering the camera lens with a finger, then control passes to a step 1640 where the counter value C is incremented.

At a step 1650, the counter value C is compared with a fourth threshold $Thr_4$. If C is not greater than $Thr_4$ then the process, in respect of the current frame, ends. However, if C is greater than $Thr_4$ then control passes to a step 1660.

The present embodiment uses a luminance resolution of 16 bits. The threshold luminance value $Thr_3$ is decimal 64. The threshold number of frames, $Thr_4$, is 25 frames (half a second).

At the step 1660, the current game mode is established. If this is a "set up" mode then at a step 1670 the camera LED 740 is set to a flashing mode to indicate that the light level is too low for use of the camera 730. However, the game set up is not inhibited in any other way. On the other hand, if the game is in a "play" mode then at a step 1680 the game operation is paused and the user may be offered a menu of options about further prosecution of the game, such as "restart", "continue", "set up options" etc. Once this point in the game software has been reached, it will be appreciated that subsequent operation of the game may be conventional. In other words, it does not make any difference, as far as the game software is concerned, whether a key was pressed on a handheld controller to cause the game to pause, or whether the arrangement described above was used to initiate the game pause.

To assist the user, depending on the current game mode, a message such as "cover camera to exit", "cover camera for menu" etc could be displayed on the display screen. For example, such messages could be displayed in only a training or beginners' mode of operation.

The skilled man will of course appreciate throughout the above description that thresholds can be handled in different ways without affecting the technical character of the system. For example, a test might be whether a particular variable is less than a threshold, less than or equal to a threshold, greater than a threshold, or greater than or equal to a threshold. The skilled man will appreciate that the scope of the attached claims is not dependent on the minor technical detail of whether exact equality to a threshold is counted as being greater than or less than the threshold.

In so far as the embodiments of the invention described above are implemented, at least in part, using software-controlled data processing apparatus, it will be appreciated that a computer program providing such software control and a storage medium by which such a computer program is stored are envisaged as aspects of the present invention.

The invention claimed is:

1. A game processing apparatus arranged to receive successive images from a video camera and to initiate a game control function in response to a user obscuring a lens of the video camera for at least a predetermined time period, the apparatus comprising:

means operable to detect an average luminance of each successive image received from the video camera;

means operable to identify that the user has covered the lens of the video camera by detecting whether the average luminance of each of a group of successive images received from the video camera in respect of the predetermined time period is lower than a threshold luminance value, the lens of the video camera being within a lens housing, the housing protruding beyond the lens so that light may be substantially prevented from reaching the lens by the user placing a finger over the lens housing without that finger touching an optical surface of the lens; and means operable to initiate the game control function of the game processing apparatus in response to detection that the average luminance of each of the group of successive images received from the video camera is lower than the threshold luminance value.

2. Apparatus according to claim 1, comprising the video camera for supplying the successive images.

3. Apparatus according to claim 1,
comprising means for detecting a current operational mode of the game processing apparatus;
in which the control function is selected from a group of control functions, the selection being dependant on the current operational mode of the game processing apparatus.

4. Apparatus according to claim 1, comprising a display screen for displaying image received from the video camera.

5. Apparatus according to claim 3, in which when the apparatus is in a game playing operational mode, the control function is a game control function.

6. Apparatus according to claim 3, in which, when the apparatus is in a game playing operational mode, the apparatus is operable to display a user message indicative of the control function.

7. Apparatus according to claim 3 in which, when the apparatus is in a game set-up mode, the control function is a user alert function to notify the user of the low average image luminance level.

8. Apparatus according to claim 5, in which the game control function is a game pause function.

9. Apparatus according to claim 8, the apparatus being operable to display a set of user options in response to the pause function.

10. Apparatus according to claim 7, in which the video camera has a user visual indicator; the user alert function being arranged to operate the user visual indicator.

11. Apparatus according to claim 10, the user visual indicator being a flashing illumination.

12. A game processing apparatus arranged to receive successive images from a video camera and to initiate a game control function in response to a user obscuring a lens of the video camera for at least a predetermined time period, the apparatus comprising:

a detector to detect an average luminance of each successive image received from the video camera and to identify that the user has covered the lens of the video camera by detecting whether the average luminance of each of a group of successive images received from the video camera in respect of the predetermined time period is lower than a threshold luminance value, the lens of the video camera being within a lens housing, the housing protruding beyond the lens so that light may be substantially prevented from reaching the lens by the user placing a finger over the lens housing without that finger touching an optical surface of the lens; and logic to initiate the game control function of the game processing apparatus in response to detection that the average luminance is lower than the threshold luminance value for at least a threshold number of successive images received from the video camera.

13. A data processing method comprising the steps of:

receiving successive images from a video camera;

initiating a game control function in response to a user obscuring a lens of the video camera for at least a predetermined time period;

detecting an average luminance of each successive image received from the video camera;

identifying that the user has covered the lens of the video camera by detecting whether the average luminance of each of the group of successive images received from the video camera is lower than a threshold luminance value, the lens of the video camera being within a lens housing, the housing protruding beyond the lens so that light may be substantially prevented from reaching the lens by the user placing a finger over the lens housing without that finger touching an optical surface of the lens; and initiating the game control function of the data processing apparatus in response to detection that the average luminance of each of the group of successive images received from the video camera is lower than the threshold luminance value.

14. A non-transitory computer-readable storage medium having instructions stored therein which, when executed, cause a computer to perform the method according to claim 13.

* * * * *